United States Patent
Coing et al.

(10) Patent No.: US 11,400,636 B2
(45) Date of Patent: Aug. 2, 2022

(54) BASE FOR AN ACCESSORY AND TANK ACCESSORY, METHOD FOR PRODUCING A TANK

(71) Applicant: PLASTIC OMNIUM ADVANCED INNOVATION AND RESEARCH, Brussels (BE)

(72) Inventors: Jean-Francois Coing, Clairoix (FR); Arnaud Tryoen, Margny-les-Compiegne (FR); Sebastien Jouie, Margny les Compiegne (FR); Yvonnig Guezennec, Venette (FR); Odile Sehier, Fleurines (FR)

(73) Assignee: PLASTIC OMNIUM ADVANCED INNOVATION AND RESEARCH, Brussels (BE)

( * ) Notice: Subject to any disclaimer, the term of this patent is extended or adjusted under 35 U.S.C. 154(b) by 1070 days.

(21) Appl. No.: 15/029,964

(22) PCT Filed: Oct. 16, 2014

(86) PCT No.: PCT/FR2014/052641
§ 371 (c)(1),
(2) Date: Apr. 15, 2016

(87) PCT Pub. No.: WO2015/055961
PCT Pub. Date: Apr. 23, 2015

(65) Prior Publication Data
US 2016/0250796 A1    Sep. 1, 2016

(30) Foreign Application Priority Data

Oct. 16, 2013  (FR) .................................... 1360086
Dec. 30, 2013  (FR) .................................... 1363703

(51) Int. Cl.
*B29C 49/20* (2006.01)
*B60K 15/03* (2006.01)
(Continued)

(52) U.S. Cl.
CPC .......... *B29C 49/20* (2013.01); *B29C 49/4268* (2013.01); *B29C 65/70* (2013.01);
(Continued)

(58) Field of Classification Search
CPC ......... B29C 49/20; B29C 65/00; B29C 65/74; B29C 51/12; B29C 65/02;
(Continued)

(56) References Cited

U.S. PATENT DOCUMENTS 6,019,348 A * 2/2000 Powell .................... B60K 15/04
                                                        141/198
D592,580 S  * 5/2009 Watson ........................ D12/218
(Continued)

FOREIGN PATENT DOCUMENTS

CN      101678595 A      3/2010
CN      101687366 A      3/2010
(Continued)

OTHER PUBLICATIONS

International Search Report dated Mar. 4, 2015 in PCT/FR14/52641 Filed Oct. 16, 2014.
(Continued)

*Primary Examiner* — Anthony D Stashick
*Assistant Examiner* — James M Van Buskirk
(74) *Attorney, Agent, or Firm* — Oblon, McClelland, Maier & Neustadt, L.L.P.

(57) ABSTRACT

A base made from plastic material for a motor vehicle tank accessory, including protrusions to be welded to a preform during production of the tank by blowing the preform, wherein: the base includes a solid surface recessed from the
(Continued)

protrusions, the solid surface including a part without protrusions and a part taken up by the protrusions, the area of the part of the solid surface without protrusions is at least equal to one times the area of the solid surface taken up by the protrusions, the height of the protrusions relative to the solid surface is between 0.6 mm and 0.8 mm.

12 Claims, 4 Drawing Sheets

(51) Int. Cl.
    *B29C 49/42*         (2006.01)
    *B29C 65/70*         (2006.01)
    *B29L 31/00*         (2006.01)

(52) U.S. Cl.
    CPC    *B60K 15/03177* (2013.01); *B29C 2049/2008* (2013.01); *B29C 2049/2034* (2013.01); *B29C 2049/2047* (2013.01); *B29L 2031/7172* (2013.01); *B60K 2015/0346* (2013.01); *B60K 2015/03453* (2013.01); *B60K 2015/03467* (2013.01); *B60K 2015/03493* (2013.01)

(58) Field of Classification Search
    CPC ............ B29C 49/42682; B29C 65/702; B29C 2049/20342; B29C 2049/20472; B60K 15/03; B60K 2015/03499; B60K 2015/0346; B60K 2015/03453; B60K 2015/03467; B29L 2031/7172
    USPC .......................................... 206/534; 220/601
    See application file for complete search history.

(56) References Cited

U.S. PATENT DOCUMENTS

| | | | |
|---|---|---|---|
| 10,112,753 B2* | 10/2018 | Horikawa | F16J 13/12 |
| 2001/0015513 A1 | 8/2001 | Schaftingen et al. | |
| 2008/0006625 A1 | 1/2008 | Borchert et al. | |
| 2008/0149642 A1* | 6/2008 | Borchert | B29C 49/20 |
| | | | 220/562 |
| 2009/0045542 A1 | 2/2009 | Borchert et al. | |
| 2009/0139994 A1* | 6/2009 | Aoki | B29C 49/20 |
| | | | 220/652 |
| 2010/0126659 A1 | 5/2010 | Roos et al. | |
| 2010/0212806 A1 | 8/2010 | Lemoine et al. | |
| 2010/0326986 A1* | 12/2010 | Poulter | B60P 3/226 |
| | | | 220/203.01 |
| 2011/0139342 A1* | 6/2011 | Jannot | B29C 37/0085 |
| | | | 156/92 |
| 2011/0221104 A1 | 9/2011 | Criel et al. | |

FOREIGN PATENT DOCUMENTS

| | | |
|---|---|---|
| CN | 102066086 A | 5/2011 |
| DE | 10 2010 032 278 A1 | 1/2012 |
| EP | 1 110 697 A2 | 6/2001 |
| EP | 1 864 782 A1 | 12/2007 |
| WO | 2010/015615 A1 | 2/2010 |
| WO | WO 2010/015670 A1 | 2/2010 |

OTHER PUBLICATIONS

Office Action dated Mar. 25, 2019 in corresponding European Patent Application No. 14 800 112. 6,10 pages.

* cited by examiner

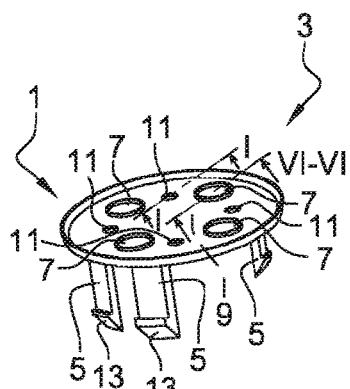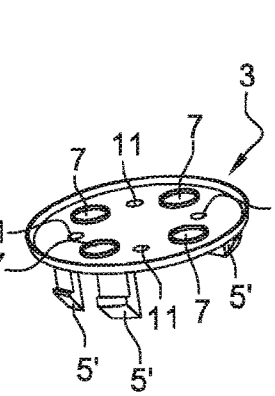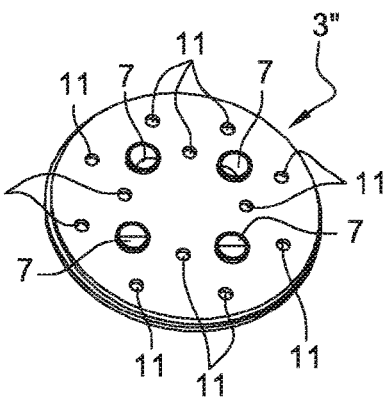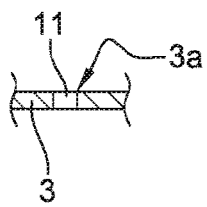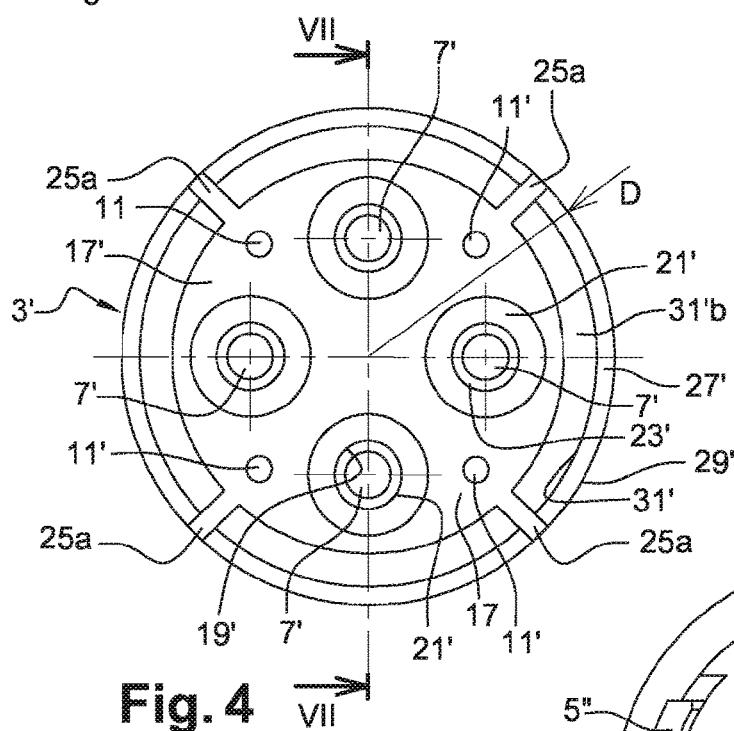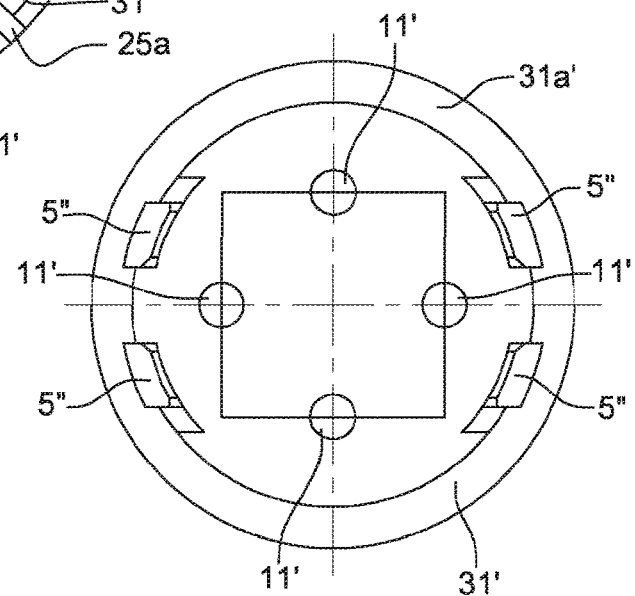

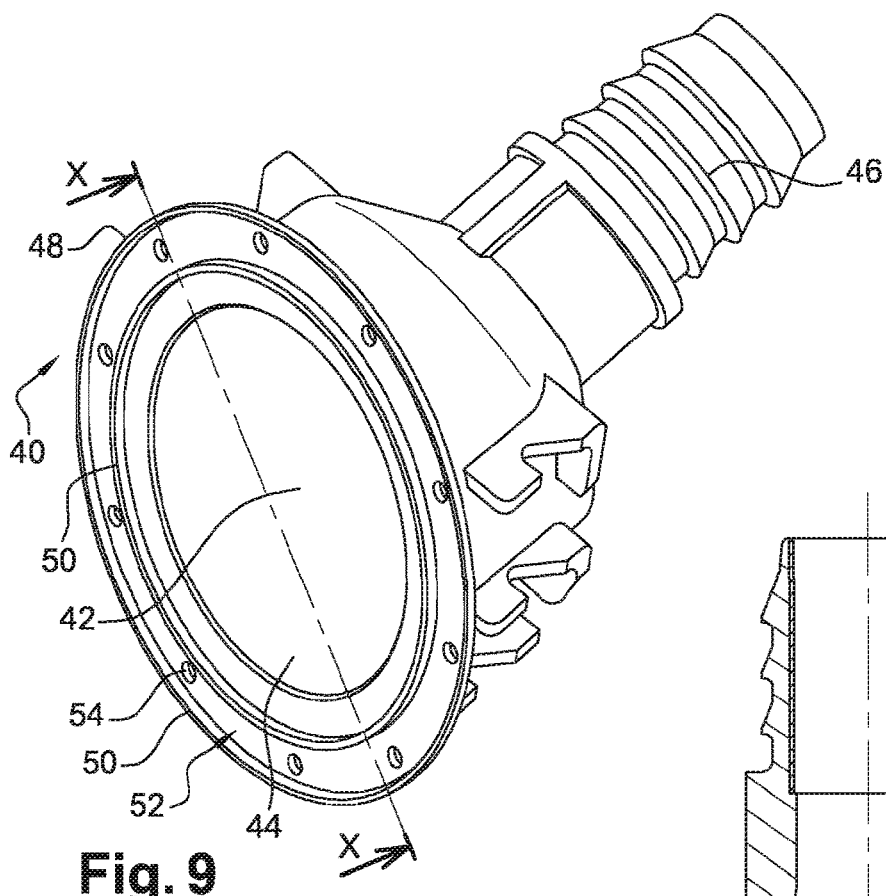
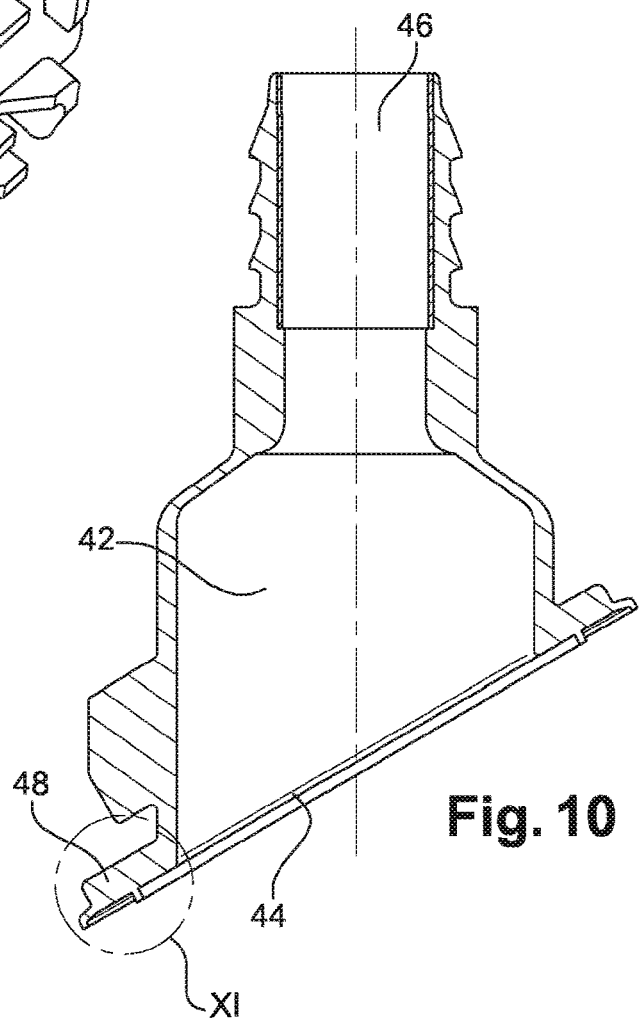
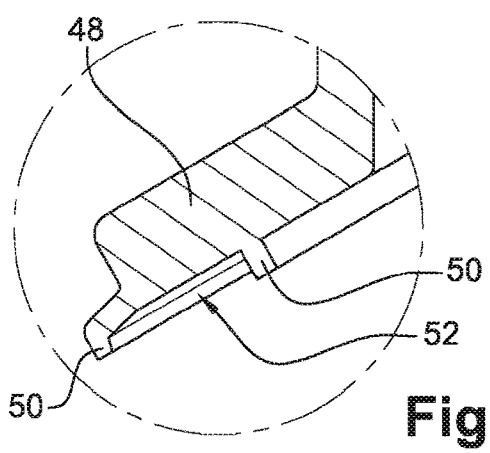
Fig. 9
Fig. 10
Fig. 11

BASE FOR AN ACCESSORY AND TANK ACCESSORY, METHOD FOR PRODUCING A TANK

TECHNICAL FIELD TO WHICH THE INVENTION RELATES

The invention relates to the field of production by blow molding of tanks made of plastic material for motor vehicles. It can involve fuel tanks or tanks for other fluids, in particular for carbamide, in a system for catalytic cleaning of the exhaust gases.

PRIOR ART

A base for securing an internal accessory of a tank is already known from document WO2010/015670. This base comprises a stop surface and a double lip which is welded on a pre-form still in the molten state during the blow molding of the latter, in the course of the production of the tank by means of the method described in application EP 1 110 697 in the name of the applicant.

On a single-layer pre-form, this method is entirely satisfactory.

On a multi-layer pre-form, which in particular contains a layer forming a barrier against hydrocarbons or other particularly volatile products, (generally made of EVOH), the penetration of the double lip into the thickness of the pre-form during the welding can give rise to deformation of the pre-form which can draw the barrier layer excessively locally. The barrier layer is then liable to become too fine. It is therefore necessary to measure the pressure on the base during the welding in order to limit the depth of penetration of the lip, and avoid reducing the thickness of the barrier layer excessively. On the other hand, if the pressure is reduced too much, it is no longer possible to ensure good quality welding of the base in the pre-form.

The present solution therefore requires great accuracy, which necessitates costly and fragile equipment.

SUMMARY OF THE INVENTION

The objective of the invention is to eliminate this disadvantage by providing a solution wherein the penetration is limited, without needing to control very accurately the pressure which is exerted on the base.

According to the invention, a stop surface is provided which is sufficiently large in relation to the parts of the base which are to be welded on the pre-form.

More specifically, the objective of the invention is a base made of plastic material for a tank accessory for a motor vehicle, comprising protrusions which are designed to be welded on a pre-form during the production of the tank by blow molding of this pre-form, characterized in that:
- the base comprises a solid surface recessed from the protrusions, this solid surface having a part which is without protrusions and part which is occupied by the protrusions;
- the area of the part of the solid surface which is without protrusions is at least equal to one times the area of the solid surface which is occupied by the protrusions.

The securing base according to the invention solves the aforementioned problems of making the welding secure without a risk of deterioration of the barrier layer of the pre-form.

According to a particular embodiment, the area of the part of the solid surface which is without protrusions is at least equal to twice the area of the solid surface which is occupied by the protrusions.

According to a particular embodiment, the protrusions are ribs, i.e. protrusions which extend longitudinally.

According to a particular embodiment, the ribs are peripheral to the solid surface.

According to a particular embodiment, the ribs form closed loops.

According to a particular embodiment, the solid surface has a circular contour.

According to a particular embodiment, the solid surface surrounds openings.

According to a particular embodiment, at least one of the openings is bordered by a protrusion.

According to a particular embodiment, the protrusion which borders the opening extends longitudinally around the entire periphery of the opening.

According to a particular embodiment, the height of the protrusions relative to the solid surface is 0.7 mm.

According to a particular embodiment, the width at the top of the protrusions is 0.5 mm.

According to a particular embodiment, the solid surface has a flat central portion and a peripheral portion which widens in the direction of the tops of protrusions, ending at the base of the protrusions.

According to a particular embodiment, the central portion is circular, and the widened peripheral portion is frusto-conical, and, in transverse cross section, forms an angle of 14° with the central portion.

According to a particular embodiment, the frusto-conical portion has a thickness of 0.7 mm.

Although the base according to the invention is particularly suitable for carrying out simultaneously the blow molding of a pre-form and the welding of the base on said pre-form during this blow molding, its characteristics also make it possible to weld it on the wall of the tank after the blow molding of the pre-form. In particular, it is possible to weld the base on the outer surface of the wall of a blow molded tank, in order to secure an external accessory on it.

The invention also relates to a connector for an internal accessory of a tank with a base as previously described and means for connection to an accessory.

The invention also relates to a connector for an external accessory of a tank with a base as previously described, and means for connection to an accessory.

The invention also relates to an accessory for a tank with a base as previously described.

The invention has a particularly advantageous application when it relates to securing on a side of the pre-form a first accessory which has an aperture in its face which is designed to be secured on the pre-form. This aperture can be designed to communicate with a second accessory subsequently placed on the other side of the pre-form. The first accessory is not necessarily situated on the inner side of the tank. However, if the production of the tank consists of blow molding a pre-form in a mold with two indentations with a core interposed between the indentations, and if the first accessory is inside the tank, it can advantageously be supported by the core during the blow molding of the pre-form.

For this purpose, a particular embodiment of an accessory according to the invention makes it possible to weld this first accessory on the pre-form by means of a sealed weld. According to this particular embodiment:
- the accessory has a base as previously described;

the base of the accessory has an aperture which is surrounded by the surface of the base designated as the solid surface which is recessed from the protrusions.

It is possible to make a first accessory of this type communicate with an accessory which is placed on the other side of the pre-form. The connection between the two accessories can be sealed by direct connection between them, or by a sealed connection firstly between the first accessory and the pre-form according to the invention, and secondly between the second accessory and the pre-form. However, in all cases, the connection between the first accessory and the pre-form is sealed, so that the volume which surrounds the first accessory does not communicate with the other side of the pre-form. The sealing property of the weld is derived from the characteristics of the base, thanks to the quality of weld which this base makes it possible to obtain.

A particular application consists of an accessory belonging to a circuit for ventilation of a fuel tank, for discharge of the fuel vapors. This accessory, which can include a liquid/vapor separator, and is or is not provided with an active venting device, comprises an aperture in one of its faces, and at least one connection for connection of a ventilation pipe. According to the invention, the aperture is surrounded by an edge which complies with the aforementioned characteristics.

Another particular application consists of an open accessory, the opening of which is designed to be shut. The opening is shut by the pre-form. In this case also, the accessory has the aforementioned characteristics, i.e.:
 the accessory has a base as previously described;
 the base of the accessory has an aperture which is surrounded by the surface of the base designated as the solid surface which is recessed from the protrusions.

An accessory of this type is incomplete until it has been welded on the pre-form, which completes it by shutting its aperture.

For example, the accessory can comprise a chamber which must be closed during functioning of the accessory. This chamber is delimited by a bottom and by a lateral wall which ends at the base. It is open opposite the bottom by means of an aperture which is surrounded by the surface of the base designated as the solid surface which is recessed from the protrusions. This aperture is shut by the pre-form after welding of the base of the accessory on the pre-form.

Another embodiment of the invention makes it possible to weld the first accessory on the pre-form by means of a non-sealed weld, then to clamp the first accessory against the pre-form by means of an added-on clamping means, in order to seal the connection between the first accessory and the pre-form. This embodiment is more particularly indicated when the first accessory is designed to communicate with a second accessory which is situated on the other side of the pre-form.

The invention also relates to a tank for a motor vehicle, comprising at least one accessory as previously described, the base of which is welded on said wall of the tank.

According to a particular embodiment, the accessory has an aperture which is surrounded by the base welded on said wall of the tank.

The invention also relates to a method for securing a base for an internal accessory of a tank for a motor vehicle, as previously described, consisting of:
 fitting the base on a core which is placed between at least two indentations of a mold for blow molding of the tank;
 interposing a pre-form which is divided into as many parts as there are indentations, and is in a molten state, between the core and each indentation;
 closing the indentations on the core;
 injecting a blow-molding gas between the core and each indentation, in order to apply each part of the pre-form against the corresponding indentation;
 applying the base against the pre-form by pressing it against the corresponding indentation, so as to transfer part of the heat of the pre-form to the protrusions of the base, so as to weld them on the pre-form;
 opening the indentations so as to release the core;
 removing the core;
 closing the indentations on themselves;
 welding the parts of the pre-form together in order to constitute a tank body;
 opening the indentations;
 removing the tank body from the mold.

The invention also relates to a method for securing a base for an external accessory of a tank for a motor vehicle, as previously described, consisting of:
 fitting the base on an indentation of a mold for blow molding of the tank, comprising a core which is placed between at least two indentations;
 interposing a pre-form which is divided into as many parts as there are indentations, and is in a molten state, between the core and each indentation;
 closing the indentations on the core;
 injecting a blow-molding gas between the core and each indentation, in order to apply each part of the pre-form against the corresponding indentation;
 applying the base against the pre-form by pressing it against a support which is provided for this purpose on the core, so as to transfer part of the heat of the pre-form to the protrusions of the base, so as to weld them on the pre-form;
 opening the indentations so as to release the core;
 removing the core;
 closing the indentations on themselves;
 welding the parts of the pre-form together in order to constitute a tank body;
 opening the indentations;
 removing the tank body from the mold.

According to a particular embodiment, the base is placed against the pre-form in conditions such that each protrusion is welded on the pre-form at a height of 0.4 mm.

BRIEF DESCRIPTION OF THE DRAWINGS

The invention will be better understood by examining the appended figures, which are provided by way of example, and do not have any limiting nature, in which:

FIG. 1 is a three-dimensional view of a securing base according to a first embodiment of the invention.

FIG. 1A is a view in cross section according to I-I in FIG. 1.

FIG. 2 is a view similar to that of FIG. 1, of a securing base according to a second embodiment of the invention.

FIG. 3 is a view similar to that of FIGS. 1 and 2 of a securing base according to a third embodiment of the invention, seen from a different angle.

FIG. 4 represents in a view from above a securing base according to a fourth embodiment.

FIG. 5 represents in a view from below the securing base in FIG. 4.

FIG. 9 is a view in perspective of an accessory provided with a base which is designed to be welded in a sealed manner on a pre-form.

FIG. 10 is a view in cross section according to X-X of the accessory in FIG. 9.

FIG. 11 is a view of the detail XI in FIG. 10,

DETAILED DESCRIPTION OF THE EMBODIMENTS

Figure 6:
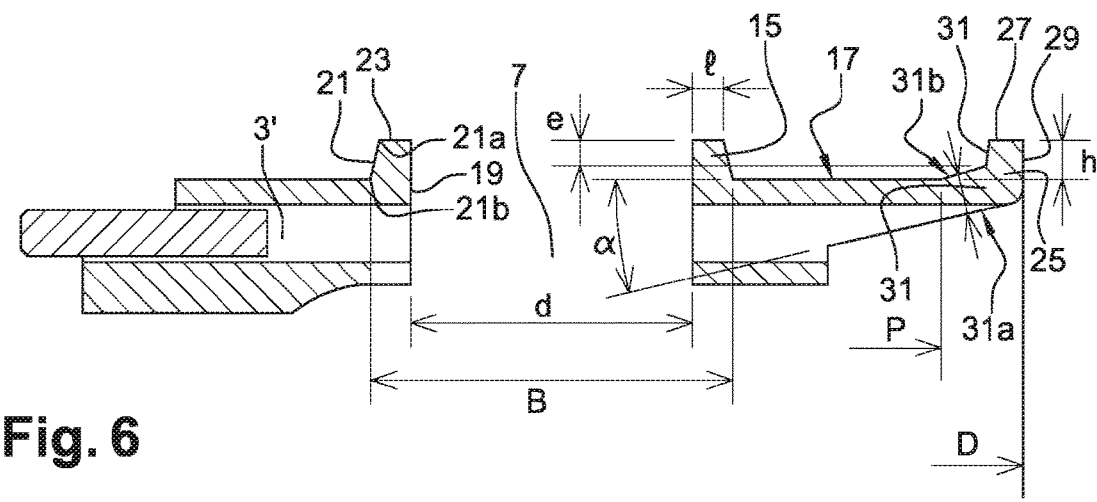
FIG. 6 is a cross section according to the plane VI-VI in FIG. 1.

The securing base 1 in FIG. 1 comprises a seat 3 which is globally in the form of a disk, and four snap-in lugs 5 which extend perpendicularly to the seat 3.

A securing base of this type is designed to be welded on the wall of a tank produced by blow molding of a pre-form made of plastic material. The pre-form constitutes a pre-form according to the invention. The seat 3 is welded, via its face opposite the snap-in lugs, on the wall, which is still warm, of the pre-form, during the forming of the latter in a blowing mold.

The heat of the pre-form is the only source of heat which permits melting of the plastic material of the seat, in its regions which are designed to be welded on the pre-form. These regions are described hereinafter.

The securing base is used to secure a unit almost always inside the tank. The seat 3 is thus welded against the inner face of the pre-form. However, it is not excluded for the securing base according to the invention to be used to secure a unit on the exterior of the tank, in which case the seat 3 is welded against the outer face of the pre-form.

During the actual welding operation, the securing base is held in position by a gripper which can either be supported by a core which is present inside the mold whilst the pre-form is put into place, or supported by the indentation of the mold, if the securing base must be rendered integral with the outer face of the tank.

In the embodiment in FIG. 1, the seat 3 is in the form of a flat disk, the diameter of which is 38.5 mm. It comprises a solid surface with a circular contour provided with four openings 7 which are circular through holes opening onto both of the two faces of the seat 3. The solid surface of the seat surrounds each of the openings 7.

Each opening has a diameter of 5 mm.

The openings 7 are distributed symmetrically around the center 9 of the seat 3, which to a certain extent makes it possible to maintain the isotropic nature of the securing base, in the sense that rendering it integral with the wall of the tank makes it possible to withstand transverse mechanical stresses (rotation, snapping, shearing) going in all directions.

It will be appreciated that, according to the invention, another arrangement of the openings, as well as a different number of openings, is possible.

The seat 3 also comprises four vents 11 arranged between the openings 7. The vents 11 are also through holes which open onto both of the two faces of the seat 3. Their diameter is 2 mm.

The snap-in lugs 5 are in the form of straight rigid tongues with a rectangular cross section, which end, at their end opposite the seat 3, in the form of a hook 13 comprising an inclined ramp and a shoulder on their side opposite the other snap-in lugs.

A description will be provided of the form of the peripheral edges of the seat 3 and each of the openings 7, with reference to FIG. 6.

The vents 11 are delimited simply by the ridge of the flat seat 3, without any relief, as can be seen in FIG. 1A.

The embodiment in FIG. 2 is distinguished from the preceding embodiment by the length of the snap-in lugs 5', which are shorter. The seat 3, the openings 7 and the vents 11 are identical to those of the embodiment in FIG. 1.

In the embodiment in FIG. 3, the solid surface of the seat 3" also comprises four openings 7, but it comprises twelve vents 11, distributed regularly between the openings 7, in order to maintain the symmetry of the securing base, and, as far as possible, its isotropic nature.

A description will now be provided of the form of the edges of the openings 7 and of the seats 3 and 3'.

The edges of the openings 7 and the edges of the seats 3 and 3" are identical in the three embodiments in FIGS. 1 to 3". Their forms and dimensions are different in the fourth embodiment in FIG. 4.

As can be seen clearly in FIG. 6, which is a cross section according to VI-VI in FIG. 1, the edge of the opening 7 is formed by a protuberance 15 in the form of a continuous peripheral rib, which forms a closed loop extending longitudinally around the entire periphery of the opening. This protuberance 15 rises to a height h=0.7 mm (+/−0.1 mm) above the flat face 17 of the solid surface of the seat. In cross section, it is formed by a trapezium, the side 19 close to the opening 7 of which is perpendicular to the flat face 17 of the seat, and the opposite side 21 of which, distant from the opening, is inclined in the direction of the opening, such that the protuberance 15 has a frusto-conical outer face corresponding to the side 21, and a cylindrical inner face corresponding to the side 19.

The protuberance 15 also has an annular flat upper face 23, which connects its frusto-conical face 21 to its cylindrical face 19. This flat annular face 23 constitutes a first area of welding of the securing base 3 on the pre-form during the blow molding of the latter. The width l of the annular face, which is also designated as the width at the top of the rib, is 0.5 mm (+/−0.05 mm), and its inner diameter d is 5 mm, which gives the annular face 23 a surface area of 15.7 mm².

Along the height h of the protuberance 15, the difference in radius between the top 21a and the bottom 21b of the frusto-conical face 21 is 0.07 mm.

These dimensions of the protuberance 15 are determined such that, taking into account the composition, the temperature and the thickness of the pre-form, as well as the force with which the securing base 1 is applied via its seat 3 against said pre-form during its blow molding, the protuberance 15 melts to a maximum thickness e of 0.4 mm, in order to be welded on the pre-form.

These particular dimensions are given by way of indication, and do not constitute the only possible embodiment of the invention. However, they give the best result from amongst different antagonistic imperatives:

ensuring the good mechanical strength of the securing base on the wall of the tank throughout the service life of the vehicle, despite the impacts and vibrations endured;

limiting the quantity of material to be melted on the securing base, in order for the welding operation to be able to take place based only on the heat of the pre-form, i.e. without additional heating;

avoiding penetrating too deeply into the thickness of the pre-form, in order not to damage the barrier layers which guarantee confinement of the (liquid and/or gaseous) product contained in the tank.

The protuberance 15 is the same around each of the openings 7 in the seats 3 and 3". Thus, the securing base 1 is welded on the pre-form by at least the four welding areas constituted by the four annular flat surfaces 23 of the four openings 7.

In addition, the securing base is welded on the pre-form by a protuberance 25 which is situated on the periphery of the seat 3, and extends as a continuous rib all around said seat 3. In a variant, the rib is interrupted at some locations, for example in four regularly distributed positions 25*a*, as illustrated in the embodiment in FIG. 4.

This protuberance 25 also has a flat annular welding face 27, situated between a cylindrical outer lateral face 29 and a frusto-conical inner face 31. Some of the dimensions already indicated for the protuberance 15 continue to be valid: elevation of the protuberance 25 to the height h, width l of the flat annular face 27.

In the vicinity of the protuberance 25, the seat 3 has a raised peripheral edge 31 which is delimited by two frusto-conical parallel faces 31*a* and 31*b* spaced by 0.7 mm (+/−0.05 mm), the generatrix of which forms an angle a of 14° with the flat face 17 of the seat 3. Thus, the solid surface of the seat has a central portion and a peripheral portion 31*b* which widens in the direction of the top of the protuberance 25, ending at the base of said protuberance 25. The central portion is circular, and the widened peripheral portion is frusto-conical. Thus, the frusto-conical portion has a thickness of 0.7 mm.

In particular, this raised peripheral edge 31 fulfils the function of retention of the protuberance 25 in contact with the pre-form during the cooling of the materials and setting of the welding. In fact, the raised peripheral edge 31 provides the seat with a certain resistance to bending, which resistance comes into play during the application of the securing base against the pre-form, since the pre-form can be allowed to penetrate further at right angles to the protuberances 15 which border the openings 7 than at right angles to the protuberance 25. In this case, bending or curving of the seat 3 is liable to occur, to the detriment of good application of the protuberance 27 against the pre-form, and therefore with the risk of a shallower weld of the protuberance 27 with the pre-form.

In this case also, the dimensions which are indicated for the protuberance 27 and the raised peripheral edge 31 are indicative, but can be considered as an optimum, taking into account the different antagonistic constraints of the application.

Thus, outside the welding areas constituted by the protuberances 15 and 25, the base comprises a flat surface which is recessed from the protuberances, this solid surface having a part which is without protuberances (the flat face 17 and the frusto-conical face 31*b*), and a part which is occupied by the protuberances 15 and 25.

By means of a simple calculation, it is found that the area of the part of the solid surface which is without protuberances is equal to four times the area of the solid surface which is occupied by the protuberances.

In fact, the seats 3 and 3" have an outer diameter D=38.5 mm, the flat part 17 has a diameter P=32.1 mm, and the outer base 21*b* of each protuberance 15 has a diameter B=6.4 mm.

Figure 7:
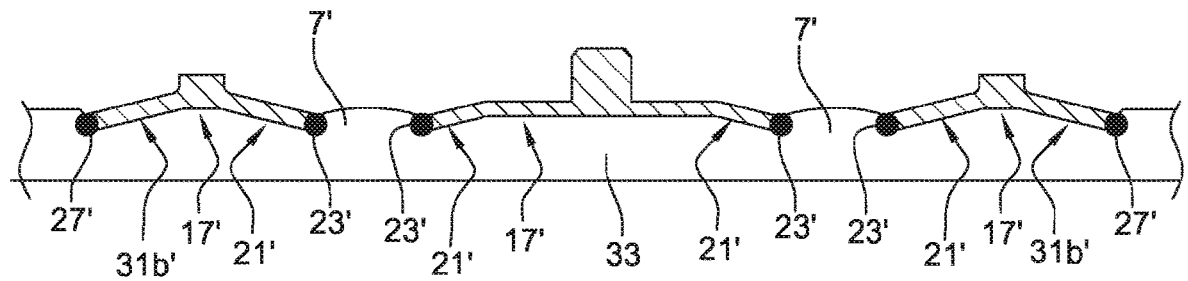
FIG. 7 is a cross section according to the plane VII-VII, positioned in FIG. 4, of the securing base in FIG. 4 assembled on a wall of a tank.

The fourth embodiment illustrated by FIGS. 4, 5 and 7 shows once more the openings 7', of which there are also four, the vents 11', of which there are likewise four, and the annular flat welding surfaces 23' and 27' on the periphery respectively of the openings 7' and the seat 3'.

Unlike in the preceding embodiments, the protuberances 15' and 25' do not have a frusto-conical lateral face, but only cylindrical lateral faces, respectively 19' and 21', and 31' and 29'. This is why these faces are reduced to circles in the view from above in FIG. 4.

The view from above in FIG. 5 shows once more the four vents 11', the snap-in lugs 5" and the raised peripheral edge 31*a'*.

The area of the part of the solid surface which is without protuberances is equal to two and a half times the area of the solid surface occupied by the protuberances.

Thanks to this ratio, the solid part 17' of the seat acts as a stop surface which limits the penetration of the protuberances 15' and 25' into the thickness of the pre-form, which in particular protects its barrier layers against excessive drawing when the protuberances of the seat penetrate into the pre-form.

This result is illustrated by FIG. 7, which shows the securing base in FIGS. 4 and 5 once it has been welded on the pre-form, and has been rendered integral with the inner wall of a tank 33.

This figure clearly shows the role of penetration limiter played by the flat wall 17' when it encounters the material of the pre-form which is still molten.

Figure 8:
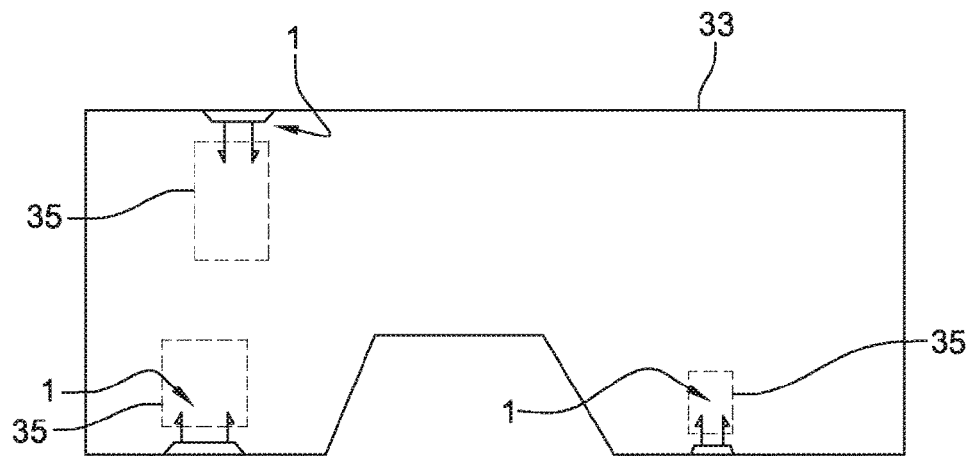
FIG. 8 is a transverse cross section of a tank provided with three securing bases according to the invention.
Figure 12:
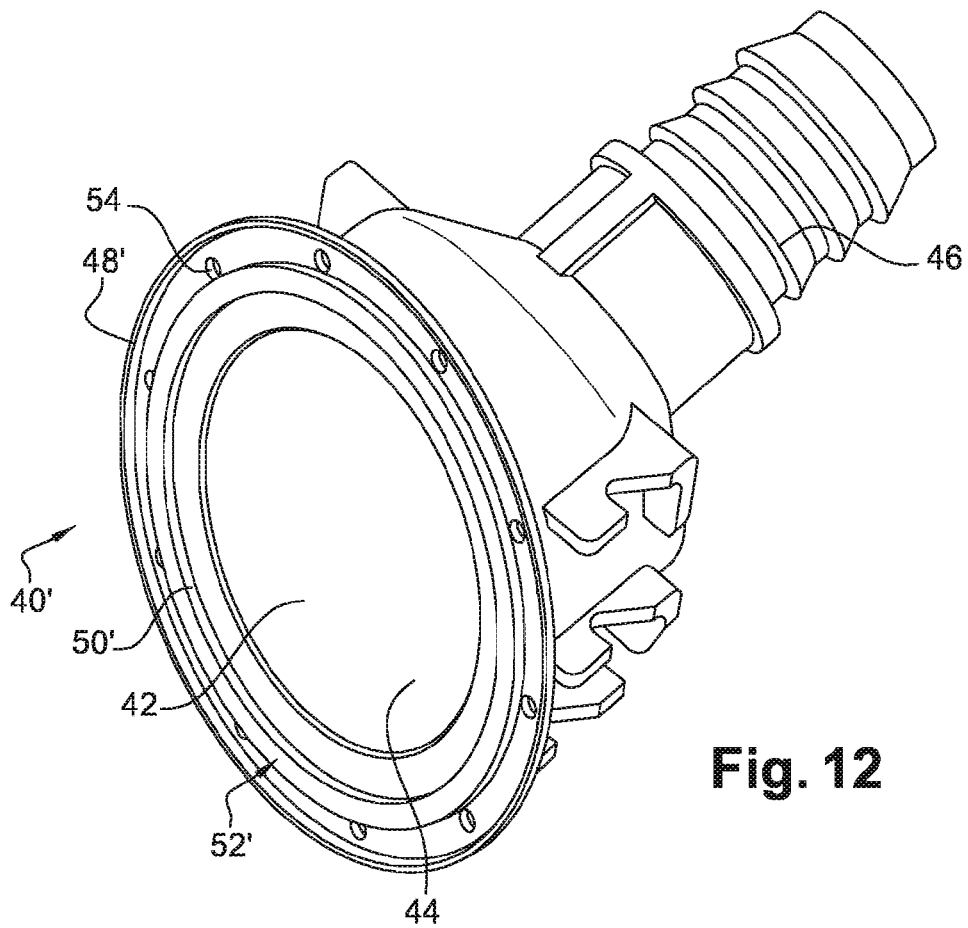
FIG. 12 is a view similar to FIG. 9 of a variant of an accessory of the same type.

FIG. 8 illustrates different positions of a securing base according to the invention.

This base is used substantially inside the tank, in order to secure in it accessories 35 which are well known to persons skilled in the art, in different positions, three of which are represented in the drawing.

FIG. 9 represents an external accessory 40, which serves the purpose of connecting piping (not represented) which is connected on the exterior of a tank (not represented).

The accessory 40 comprises a chamber 42 which opens firstly onto the exterior of the accessory via an aperture 44, and secondly onto a connection of the piping 46.

The precise form of the accessory 40 will not be described here, since it does not illustrate the essential characteristics of the invention. The important aspect of the accessory 40 is for it to have a base so that it can be welded on a multilayer pre-form during the forming of the latter by means of blow molding. This base is constituted by a flange 48 which surrounds the aperture 44.

According to the invention, the flange 48 comprises protuberances 50 in the form of annular ribs which are designed to be welded on the pre-form during the production of the tank by blow molding of this pre-form, with a solid surface 52 which is recessed from the protuberances 50, this solid surface 52 having a part which is without protuberances and a part which is occupied by the protuberances, the area of the part of the solid surface which is without protuberances being at least equal to one times the area of the solid surface which is occupied by the protuberances.

In addition, the solid surface 52 comprises vents 54 for the discharge of air between said surface and the pre-form during the welding.

Thanks to these characteristics, the accessory 40 can be welded in a sealed manner on the pre-form, without penetrating excessively into the thickness of the pre-form, and therefore without damaging the sealed layer of the pre-form.

In the variant illustrated in FIG. 13, the elements which bear the same reference numbers are identical to those described with reference to the preceding figures.

The accessory 40' has a flange 48' constituting a base comprising a solid surface 52', from which there extends a protuberance 50' in the form of an annular rib. Vents 54 are provided in the solid surface 52'.

Like the accessory 40, the accessory 40' can be welded on a pre-form during its blow molding.

An advantage of the accessory 40, 40' is that it can be rendered integral with the tank during the blow molding of the latter, without an operation of resumption or intervention inside the tank. It is therefore possible to provide a tank with an accessory of this type, including in inner regions of said tank which are inaccessible after production of the tank.

Figure 13:
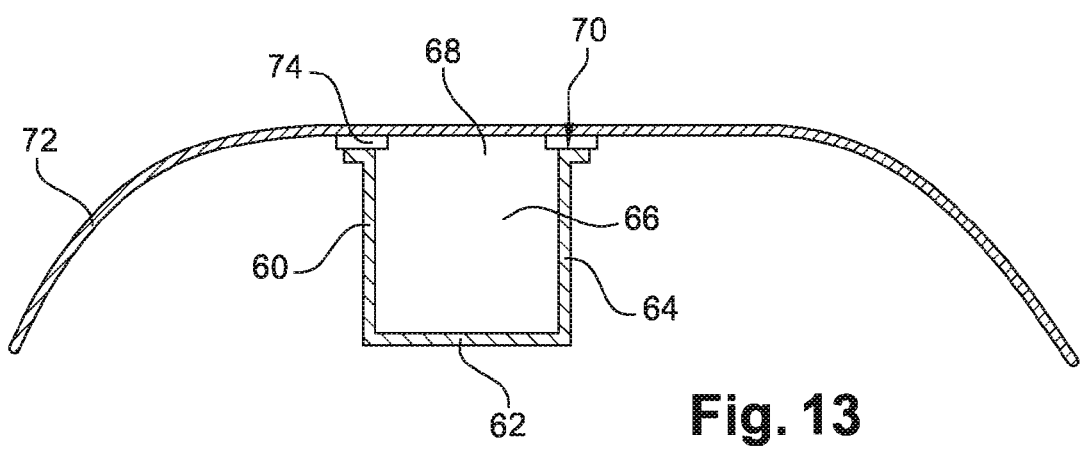
FIG. 13 is a view in cross section of an accessory in the form of a bell which must form a sealed volume with the pre-form.

FIG. 13 represents another embodiment of an accessory 60 according to the invention. This accessory 60 is globally in the form of a bell, which is why it is schematized in the figure with a cross section in the form of a "U".

The accessory 60 has a bottom 62 and a lateral wall 64 which delimit an inner chamber 66 open at the top (in the direction shown in FIG. 13). Thus, the inner chamber 66 is open opposite the bottom 62 by means of an aperture 68 which is surrounded by a base 70 in the form of a flange.

Like the base 48, 48' in the two preceding embodiments, the base 70 comprises one or a plurality of annular grooves forming protuberances extending from a solid surface which is recessed from the protuberances. In FIG. 13, the protuberances are not represented, since the base 70 has been welded on the wall 72 of a tank during blow molding of a pre-form, and the welding is schematized by a thick line 74. Once the welding has been carried out, the chamber 66 is closed in a sealed manner by the wall 72 of the tank (except for the functional inlets and outlets), and remains closed throughout the service life of the tank, i.e. during the functioning of the accessory. Thus, there is no need to have to create a partition on the accessory on the side of the tank wall, whilst a means is provided for securing the accessory on the wall 72 reliably, and in a manner which does not destroy the barrier layer of the multilayer pre-form. If the accessory is designed to communicate with the exterior of the tank, the wall 72 can easily be pierced in its region which is situated opposite the aperture 68, and the connection between the accessory 60 and an external accessory (not represented) can be formed without having to enter the tank. The connection between the two accessories can:
 either take advantage of the sealing of the weld 70, in which case it is sufficient for the external accessory also to be welded in a sealed manner on the wall 72;
 or be a connection by direct sealed contact between the two accessories.

In all cases, the sealing of the weld 70 makes it possible to prevent the liquids and gases contained in the tank from penetrating into the chamber 66.

The invention is not limited to the embodiments presented, and other embodiments will become clearly apparent to persons skilled in the art.

The invention claimed is:

1. A base made of plastic material for a tank accessory for a motor vehicle, comprising:
 protrusions configured to be welded on a pre-form during production of the tank by blow molding of the pre-form;
 wherein
 the base includes a solid surface recessed from the protrusions, the solid surface including a part which is without protrusions and a part which is occupied by the protrusions;
 the area of the part of the solid surface which is without protrusions is at least equal to one times the area of the solid surface which is occupied by the protrusions;
 wherein the solid surface surrounds openings, and
 the solid surface includes, on the same face of said solid surface, a flat central portion and a peripheral portion that raises in the direction of tops of protrusions, ending at a base of the protrusions, the protrusions are on the same face of said solid surface as the flat central portion and peripheral portion.

2. The base as claimed in claim 1, wherein the area of the part of the solid surface which is without protrusions is at least equal to twice the area of the solid surface which is occupied by the protrusions.

3. The base as claimed in claim 1, wherein the protrusions are ribs.

4. The base as claimed in claim 1, wherein the solid surface has a circular contour.

5. The base as claimed in claim 1, wherein the openings are distributed symmetrically around the center of the solid surface.

6. The base as claimed in claim 1, wherein the ribs are peripheral on the solid surface.

7. The base as claimed in claim 1, wherein at least one of the openings is bordered by a protrusion.

8. The base as claimed in claim 1, wherein the flat central portion is circular, and the peripheral portion is frusto-conical, and, in transverse cross section, forms an angle with the flat central portion.

9. The base as claimed in claim 8, wherein the flat central portion is circular, and the peripheral portion is frusto-conical, and, in transverse cross section, forms an angle of 14° with the flat central portion.

10. A method for securing a base for an internal accessory of a tank for a motor vehicle, as claimed in claim 1, comprising:
 fitting the base on a core which is placed between at least two indentations of a mold for blow molding of the tank;
 interposing a pre-form which is divided into as many parts as there are indentations, and is in a molten state, between the core and each indentation;
 closing the indentations on the core;
 injecting a blow-molding gas between the core and each indentation, to apply each part of the pre-form against the corresponding indentation;
 applying the base against the pre-form by pressing it against the corresponding indentation, to transfer part of the heat of the pre-form to the protrusions of the base, to weld them on the pre-form;
 opening the indentations to release the core;
 removing the core;
 closing the indentations on themselves;
 welding the parts of the pre-form together to constitute a tank body;
 opening the indentations;
 removing the tank body from the mold.

11. A method for securing a base for an external accessory of a tank for a motor vehicle, as claimed in claim 1, comprising:
 fitting the base on an indentation of a mold for blow molding of the tank, comprising a core which is placed between at least two indentations;

interposing a pre-form which is divided into as many parts as there are indentations, and is in a molten state, between the core and each indentation;

closing the indentations on the core;

injecting a blow-molding gas between the core and each indentation, to apply each part of the pre-form against the corresponding indentation;

applying the base against the pre-form by pressing it against a support which is provided for this purpose on the core, to transfer part of the heat of the pre-form to the protrusions of the base, to weld them on the pre-form;

opening the indentations to release the core;

removing the core;

closing the indentations on themselves;

welding the parts of the pre-form together to constitute a tank body;

opening the indentations;

removing the tank body from the mold.

12. A base made of plastic material for a tank accessory for a motor vehicle, comprising:

protrusions configured to be welded on a pre-form during production of the tank by blow molding of the pre-form;

wherein the base includes a solid surface recessed from the protrusions, the solid surface including a part which is without protrusions and a part which is occupied by the protrusions;

the area of the part of the solid surface which is without protrusions is at least equal to one times the area of the solid surface which is occupied by the protrusions;

wherein the solid surface surrounds openings, and the solid surface includes, on the same face of said solid surface, a flat central portion and a peripheral portion that widens in the direction of tops of protrusions, ending at a base of the protrusions, the protrusions are on the same face of said solid surface as the flat central portion and peripheral portion.

* * * * *